Patented Apr. 11, 1944

2,346,451

UNITED STATES PATENT OFFICE 2,346,451

POZZOLANIC MATERIALS AND METHOD OF MAKING SAME

Mario Palmieri, Evanston, and Arnold J. Beck, Riverside, Ill., assignors of one-half to The Sanitary District of Chicago, Chicago, Ill., a corporation of Illinois No Drawing. Application November 12, 1938, Serial No. 240,042

6 Claims. (Cl. 106—100)

This invention relates to pozzolanic materials and to the method for producing the same.

This application is a continuation in part of our copending application Serial No. 72,976; filed April 6, 1936, which has eventuated into Patent No. 2,140,850, granted December 20, 1938.

A pozzolanic material is a substance which evinces the properties of producing a cementitious material capable of setting and hardening under water when mixed with lime; capable of conferring additional strength, continuously increasing with the passage of time, to the normal strength of cementitious mixtures made with Portland cement, and capable when mixed with lime or Portland cement, to form a cementitious material which will resist the action of sea water, sulphate waters and other chemically aggressive waters. A material that does not satisfy all of the foregoing requirements is not a desirable pozzolanic material.

Pozzolanic materials have been used since early Roman civilization in connection with lime to produce hydraulic cementitious mixtures which could withstand the action of sea water. The structures then made with such mixtures of lime and pozzolanas are still standing after two thousand years of use. With the discovery of Portland cement the use of pozzolanas was superseded by the development of artificial cement. Lately, owing to the fact that Portland cement does not withstand the action of sea water, sulphate waters and other chemically aggressive waters, pozzolanas have been employed again as admixtures for Portland cement to react with the lime liberated by the cementitious compounds existing in Portland cement during the process of hydration.

Owing to the scarcity of good natural pozzolanas, attempts have been made to produce pozzolanas out of inert materials. Such attempts have consisted mainly of thermic processes at various temperatures. Such processes, however, have not met with much success. Prior to our invention there have not been known or available any artificial pozzolanas that will satisfactorily meet the foregoing requirements. Zeolites cannot be used for this purpose, for, while they do impart to a mixture of lime and sand the characteristic of setting and hardening under water, they nevertheless are unable to impart to Portland cement the characteristics of an additional strength continuously increasing with the passage of time, and the resistance to the action of sea waters, sulphate waters and other chemically aggressive waters.

Among the objects of our invention is to produce desirable and satisfactory pozzolanic material that will have the advantages and meet the requirements, as well as eliminate the disadvantages, set forth above, and such material that can be produced in large quantities at a low cost from easily obtainable and economical substances.

A further object is to provide a novel and efficient method to produce pozzolanic material, and further, such a method that is easy of being practiced and sure of result.

Other objects, advantages and capabilities, and such that are inherent in our invention, will later become more readily apparent.

We have found that if a thermic treatment of clays and other argillaceous materials is carried out within a certain range of temperatures in the presence of a small amount of alkalies, or salts of an alkali, a radical change takes place, so that by our invention materials practically inert as to pozzolanic effect can be rendered highly active as a pozzolana, and even more active than natural pozzolanas.

In carrying out our invention, materials having substantial percentages of silica and alumina in their composition, either naturally or artificially combined, are subjected to thermic treatment in the presence of an alkali or a salt of an alkali. This treatment brings about the transformation of materials that are totally inert, partially inert, or slightly active as to pozzolanic effects, to highly active pozzolanic materials.

Among the materials which are susceptible to treatment according to our invention, are all argillaceous compounds and mixtures, such as clays, shales, slates, kaolin, bentonite, feldspars, volcanic ash, and the like. By clays we mean to include sedimentary or water transported clays, as well as residual clays.

The material selected for treatment is pulverized and, if necessary, previously dried to enable it to be pulverized. Having reduced it to a powder capable of passing through a sieve of the order of 100 mesh to the inch, and finer if desired, the material is freed of all foreign particles. This done, an alkali or a salt of an alkali is added to it in the proportion of 0.5% to 10% by weight and intimately mixed with it. Among the alkalies to be used are sodium hydroxide and potassium hydroxide, while as salts of an alkali we include sodium chloride, sodium sulphate, sodium carbonate, sodium silicate, sodium acetate, sodium borate, potassium chloride, potassium sulphate, potassium carbonate, potassium silicate, potassium acetate and the like.

The mixture is then introduced into a furnace of any desired type, preferably a rotary kiln, and heated gradually to a temperature of 1600° F. to 2000° F., the exact temperature depending upon the chemical composition of the particular material used. The temperature shall be no higher than that which will bring the mixture to a condition approaching incipient sintering. As a matter of fact, the final temperature must in all cases be slightly below that which would bring about incipient sintering. It is safe, therefore, to utilize a temperature of approximately 50° F. below the coalescing temperature, so that after heating, the particles of the mixture will have not coalesced and the particles will have substantially the same sieve analysis as before heating. Having brought the mixture to the desired temperature it is allowed to cool, but the time during which the mixture is allowed to remain at the highest temperature varies with the type and the size of the furnace used. The treated material is then removed from the furnace, cooled and ground to the desired fineness, the degree of fineness being determined by other considerations than those inherent to the success of the process. In other words, it may be found necessary in some cases to satisfy the requirement of furnishing a pozzolanic material so finely ground as to pass 100% through a 325 mesh sieve, and at other times only 50%, or other percentages, according to requests of users of the material.

The alkali or the salt of an alkali may be added either before or during the heating process, in a separate container, or in the furnace itself, with the fuel, or in any other suitable manner, without departing from the spirit of our invention. Also the precise ingredients, proportions, time and temperatures stated are given as being illustrative only, and are not intended as limiting the scope of the invention.

Having now described our invention, we claim:

1. A material of manufacture having a high degree of pozzolanic activity, comprising a mixture of from 90 to 99.5 per cent of clay, and from 10 to 0.5 per cent of a monovalent alkali material of the group consisting of sodium chloride, sodium sulphate, sodium carbonate, sodium silicate, sodium acetate, sodium borate, potassium chloride, potassium sulphate, potassium carbonate, potassium silicate, potassium acetate, sodium hydroxide and potassium hydroxide, said material being the resultant product of heating said mixture to a temperature slightly below the coalescing temperature.

2. A material of manufacture having a high degree of pozzolanic activity, comprising a mixture of from 90 to 99.5 per cent of argillaceous material, and from 10 to 0.5 per cent of a monovalent alkali material of the group consisting of sodium chloride, sodium sulphate, sodium carbonate, sodium silicate, sodium acetate, sodium borate, potassium chloride, potassium sulphate, potassium carbonate, potassium silicate, potassium acetate, sodium hydroxide and potassium hydroxide, said material being the resultant product of heating said mixture to a temperature slightly below the coalescing temperature.

3. A pozzolanic material comprising a mixture of from 90 to 99.5 per cent of an argillaceous material of the group consisting of clay, shale, slate, kaolin, bentonite, feldspar and volcanic ash; and from 0.5 to 10 per cent by weight of a monovalent alkali material of the group consisting of sodium chloride, sodium sulphate, sodium carbonate, sodium silicate, sodium acetate, sodium borate, sodium hydroxide, potassium chloride, potassium sulphate, potassium carbonate, potassium silicate, potassium acetate and potassium hydroxide, said pozzolanic material being the resultant product of heating said mixture to a temperature slightly below the coalescing temperature.

4. The process of producing a pozzolanic material, which consists in intimately mixing from 0.5 to 10 per cent by weight of a monovalent alkaline material of the group consisting of sodium chloride, sodium sulphate, sodium carbonate, sodium silicate, sodium acetate, sodium borate, sodium hydroxide, potassium chloride, potassium sulphate, potassium carbonate, potassium silicate, potassium acetate and potassium hydroxide, with from 99.5 to 90 per cent of pulverized argillaceous material, introducing the mixture into a furnace, heating it gradually to from 1600° F. to 2000° F. depending upon the characteristics of the material used, the maximum temperature to be close to but slightly below the coalescing temperature, so that the particles after heating will have substantially the same sieve analysis as before heating.

5. The process of producing a pozzolanic material, which consists in drying and pulverizing an argillaceous material, intimately mixing therewith from 0.5 to 10 per cent by weight of a monovalent alkaline material of the group consisting of sodium chloride, sodium sulphate, sodium carbonate, sodium silicate, sodium acetate, sodium borate, sodium hydroxide, potassium chloride, potassium sulphate, potassium carbonate, potassium silicate, potassium acetate and potassium hydroxide, and heating the mixture to a temperature close to but slightly below the coalescing temperature so that the particles after heating will have substantially the same sieve analysis as before heating.

6. The process of producing a pozzolanic material, which consists in drying and pulverizing an argillaceous material of the group consisting of clay, shale, slate, kaolin, bentonite, feldspar and volcanic ash, intimately mixing therewith from 0.5 to 10 per cent by weight of a monovalent alkaline material of the group consisting of sodium chloride, sodium sulphate, sodium carbonate, sodium silicate, sodium acetate, sodium borate, sodium hydroxide, potassium chloride, potassium sulphate, potassium carbonate, potassium silicate, potassium acetate and potassium hydroxide, and heating the mixture to a temperature close to but slightly below the coalescing temperature so that the particles after heating will have substantially the same sieve analysis as before heating.

MARIO PALMIERI.
ARNOLD J. BECK.